June 5, 1928.

W. J. WATERS

HYDRAULIC JACK

Re. 16,989

Original Filed Sept. 18, 1924 8 Sheets-Sheet 1

Inventor
William J. Waters
By his Attorneys
Townsend & Decker

June 5, 1928.

W. J. WATERS

HYDRAULIC JACK

Re. 16,989

Original Filed Sept. 18, 1924 8 Sheets-Sheet 2

Inventor

William J. Waters

By his Attorneys

Townsend & Becker

June 5, 1928.

W. J. WATERS

HYDRAULIC JACK

Re. 16,989

Original filed Sept. 18, 1924

8 Sheets-Sheet 3

Inventor
William J Waters
By his Attorneys
Townsend & Decker

June 5, 1928. W. J. WATERS Re. 16,989

HYDRAULIC JACK

Original Filed Sept. 18, 1924 8 Sheets-Sheet 4

Inventor
William J. Waters
By his Attorneys
Townsend & Decker

June 5, 1928.

W. J. WATERS

HYDRAULIC JACK

Re. 16,989

Original Filed Sept. 18, 1924 8 Sheets-Sheet 5

Inventor
William J. Waters
By his Attorneys
Townsend & Decker

June 5, 1928.

W. J. WATERS

HYDRAULIC JACK

Re. 16,989

Original Filed Sept. 18, 1924

8 Sheets-Sheet 6

Inventor
William J. Waters

By his Attorneys
Townsend & Decker

June 5, 1928. W. J. WATERS Re. 16,989

HYDRAULIC JACK

Original Filed Sept. 18, 1924 8 Sheets-Sheet 7

Inventor
William J. Waters
By his Attorneys
Townsend & Decker

June 5, 1928.

W. J. WATERS

HYDRAULIC JACK

Re. 16,989

Original Filed Sept. 18, 1924 8 Sheets-Sheet 8

Inventor
William J. Waters
By his Attorneys
Townsend & Decker

Reissued June 5, 1928. Re. 16,989

UNITED STATES PATENT OFFICE.

WILLIAM J. WATERS, OF ELIZABETH, NEW JERSEY, ASSIGNOR TO THE WATSON-STILLMAN CO., OF NEW YORK, N. Y., A CORPORATION OF NEW JERSEY.

HYDRAULIC JACK.

Original No. 1,571,029, dated January 26, 1926, Serial No. 738,350, filed September 18, 1924. Application for reissue filed April 19, 1928. Serial No. 271,375.

My invention relates to power operated pit jacks and more particularly to pit jack apparatus employed for removal and replacement of the wheels and axles or other parts of locomotives, cars or other vehicles and wherein the jack with its load may be caused to traverse the pit in a direction transverse to the vehicle.

One of the objects of my invention is to provide an apparatus wherein the jack may be operated and the carriage supporting the same may be traversed from one motor also mounted on the carriage and supplied with a suitable motive power agent such as compressed air or electricity.

The invention further pertains to an apparatus of the character stated wherein the jack is hydraulically operated by a pump also mounted on the carriage and driven by the motor which operates the drive mechanism of the carriage to traverse the same.

My invention relates particularly to a pit jack of the character described wherein the load picked up and traversed by the carriage is received upon a transfer table or platform with which the jack head engages.

Another object of my invention is to provide suitable means whereby the transfer table or platform may be supported in stabilized position by engagement of the jack head therewith and during traverse of the carriage.

Another object of my invention is to provide suitable means whereby the transfer table with its load may be properly guided in its up and down movements under the action of the jack and whereby also the said transfer table or platform with its load may be firmly supported independently of the jack.

A further object of my invention is to provide for the operation and control of the jack and of the traversing movement of the carriage by an equipment all mounted upon the carriage.

A further object of the invention is to provide for a rapid movement of the hydraulically operated jack independently of the pump for the purpose of bringing it into rapid engagement with the work for raising or lowering it.

A further object of the invention is to provide for ease of starting of the hydraulic pump by the motor and to allow the pump to idle when the jack is traversing by the power of the motor.

Another object of my invention is to provide suitable blocking stops or gibs which may be quickly and readily centered and brought into or out of operative position with relation to a wheeled load upon the transfer table.

A further object of the invention is to provide a safety device which will prevent traversing of the jack by the motor so long as the jack or jack head is in projected or extended position.

A further object of the invention is to provide an apparatus of the character described which shall be durable, strong and safe in operation.

The invention consists in the improved constructions and combinations of devices as hereinafter more particularly described and claimed whereby the above objects and others referred to more particularly in the specification may be attained.

The invention will be described in connection with the use of compressed air as the motive power for operating the jack or its pump and for operating the drive mechanism of the jack supporting carriage, it being understood that any other motive power agent might be employed to drive a suitable motor which would actuate the pump and the drive for the carriage, suitable control devices appropriate for such motor being employed.

Fig. 14 is a diagrammatic view illustrating in conventional form the functioning of valves used with my invention.

Figure 1:
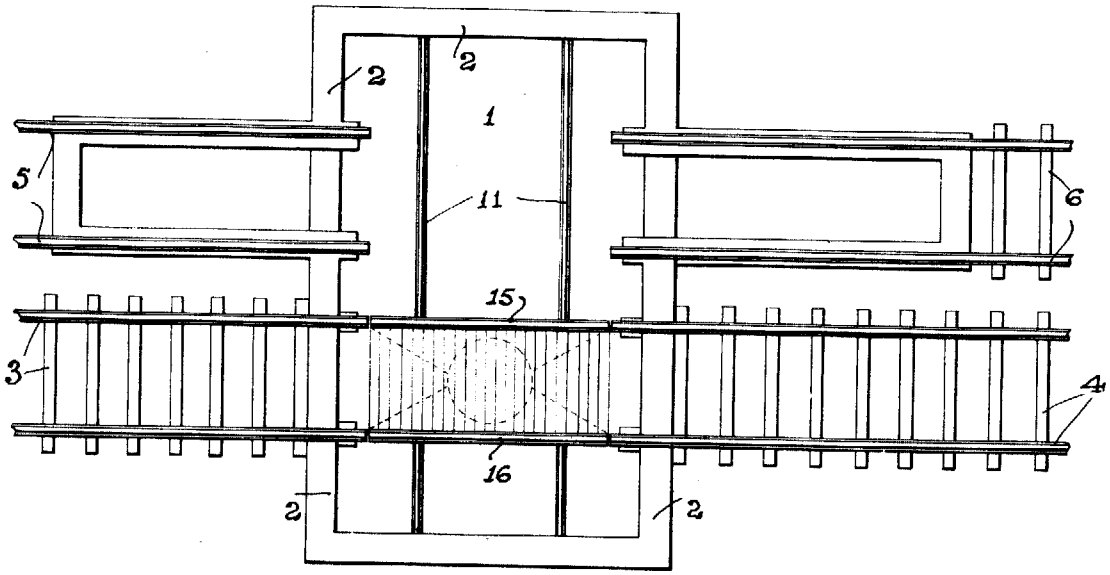
Fig. 1 is a plan view showing a drop pit and transfer table or platform and the associated tracks or ways.

In Fig. 1 I have illustrated the general layout of a drop pit. The drop pit is merely a hole or cavity 1 having side walls 2. Leading up to the drop pit from either side is a line of tracks 3 and 4 and adjacent the tracks 3 and 4 is another line of tracks 5 and 6. The tracks 3 and 4 may be considered as those upon which the vehicle, as a car or locomotive, is positioned in order to remove the desired part. The tracks 5 and 6 may be considered as repair tracks or those onto which the desired part may be rolled after being removed, and there worked upon or moved to some machine or repair floor connected by a track with tracks 5 or 6. Obviously any number of interrupted lines of track like 3 and 4 or 5 and 6 may be used in cooperation with the pit jack, the pit being correspondingly lengthened to permit the jack carriage to be traversed into position coinciding with any interruption.

Figure 2:
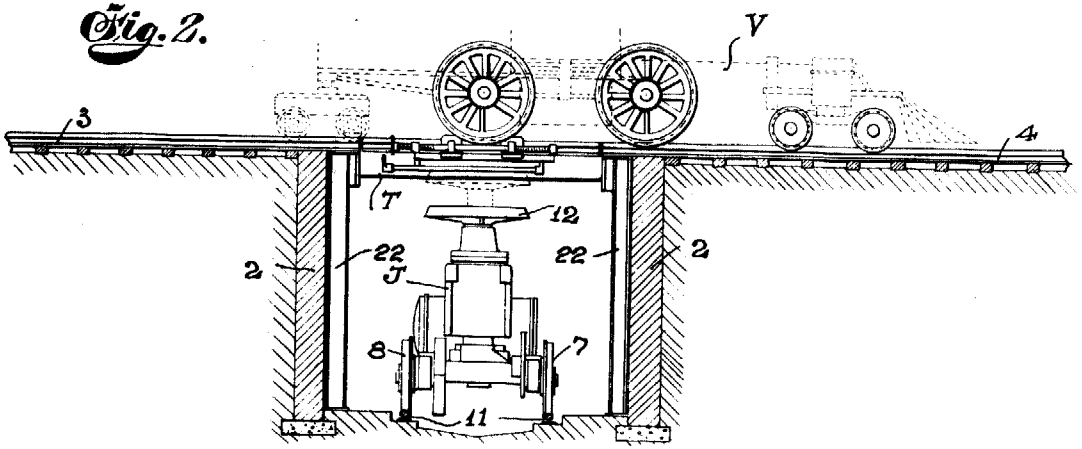
Fig. 2 is an elevation partly in cross-section of the drop pit layout shown by Fig. 1 and showing the raising and lowering mechanism of my invention located in the pit and a fragment of the running gear and lower portion of a body of a locomotive positioned over the drop pit.
Figure 5:
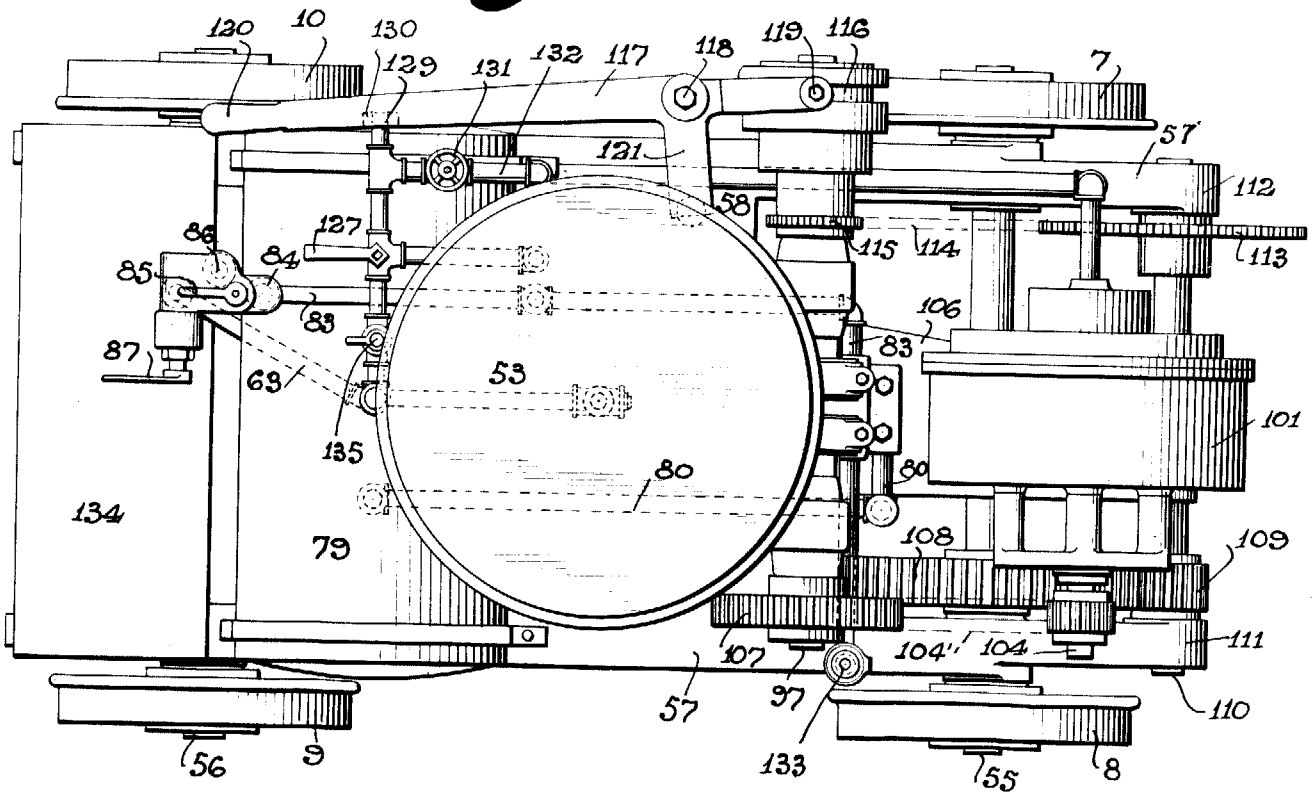
Fig. 5 is a top plan view of the mechanism as shown by Fig. 3.

The raising or lowering mechanism in the drop pit for removing or transporting the desired part is designated as a whole in Fig. 2 by J. This raising, lowering and transporting mechanism J is mounted suitably on a carriage having wheels as 7, 8, 9 and 10. Two of the wheels are shown in Fig. 2. The others are best seen in Fig. 5. This mechanism J has its wheels resting upon a trackway 11 positioned in the bottom of the pit and transverse to the trackways 3, 4, 5 and 6. The mechanism J has a member 12 forming a jack head which by suitable mechanism hereinafter to be described may be raised or lowered. When the member 12 is in the raised position as indicated by dotted lines in Fig. 2 it engages with the transfer table or platform designated as a whole in Fig. 2 by T and is of suitable construction to receive the transfer table T and lower it bodily with any part of the vehicle which has been positioned thereon and freed from the remainder of the vehicle so that the part so removed may by the lowering of the transfer table T be removed from beneath the vehicle designated as a whole by V and moved by the traverse of J in the pit from position bridging the gap or interruption in tracks 3 and 4 for instance, from or to position between the interrupted ends of the sections 5—6 of another line of tracks.

Applicant's invention pertains to the mechanism J which will be designated the pit jack and to the mechanism T which will be designated a transfer table, and to the combinations and arrangements and interconnections between the two and their method of mounting and assembling with the sides of the drop pit 1 and the tracks 3 and 4.

Figure 8:
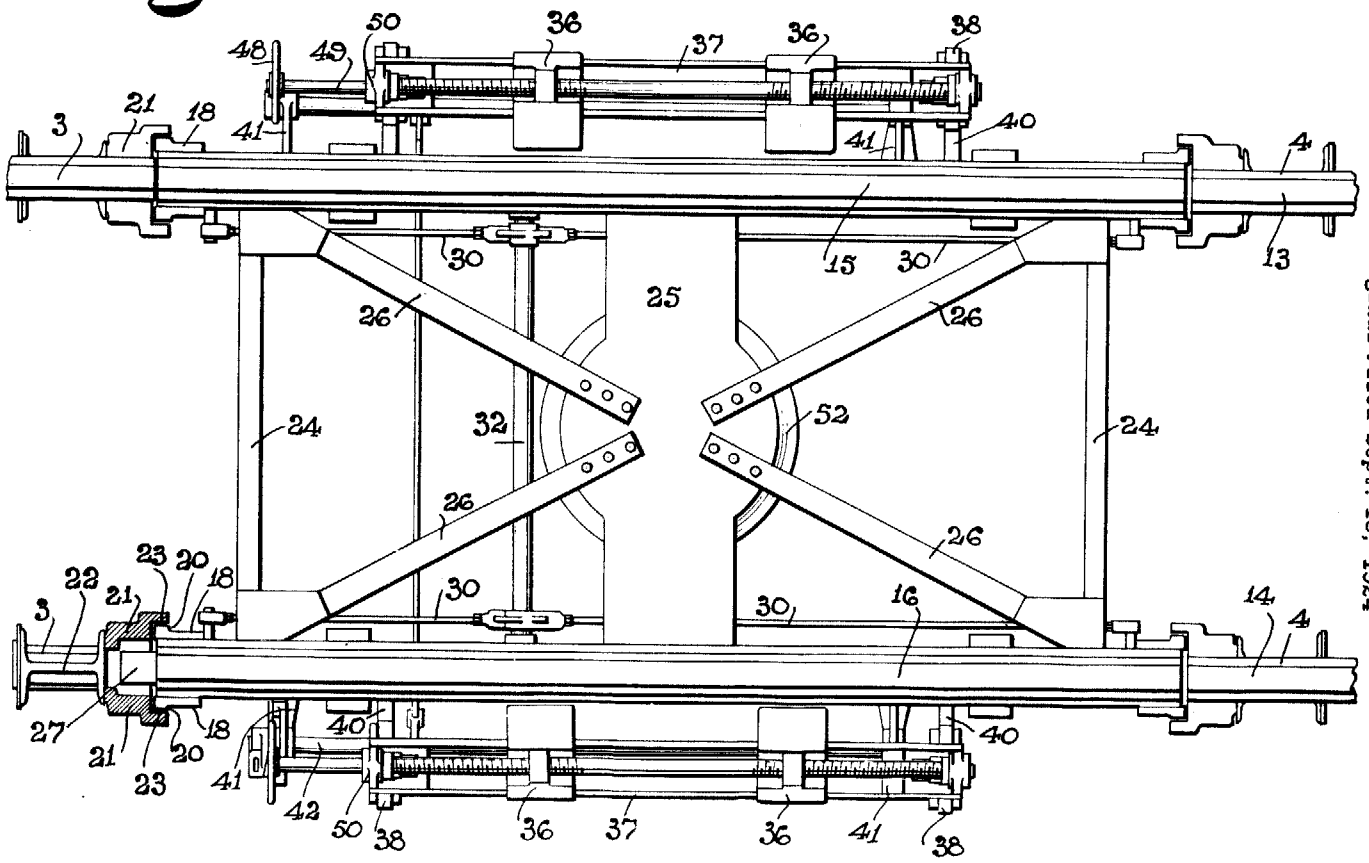
Fig. 8 is a top plan view of the transfer table as shown in Fig. 1 with some of the parts in cross-section to more clearly show the construction.
Figure 9:
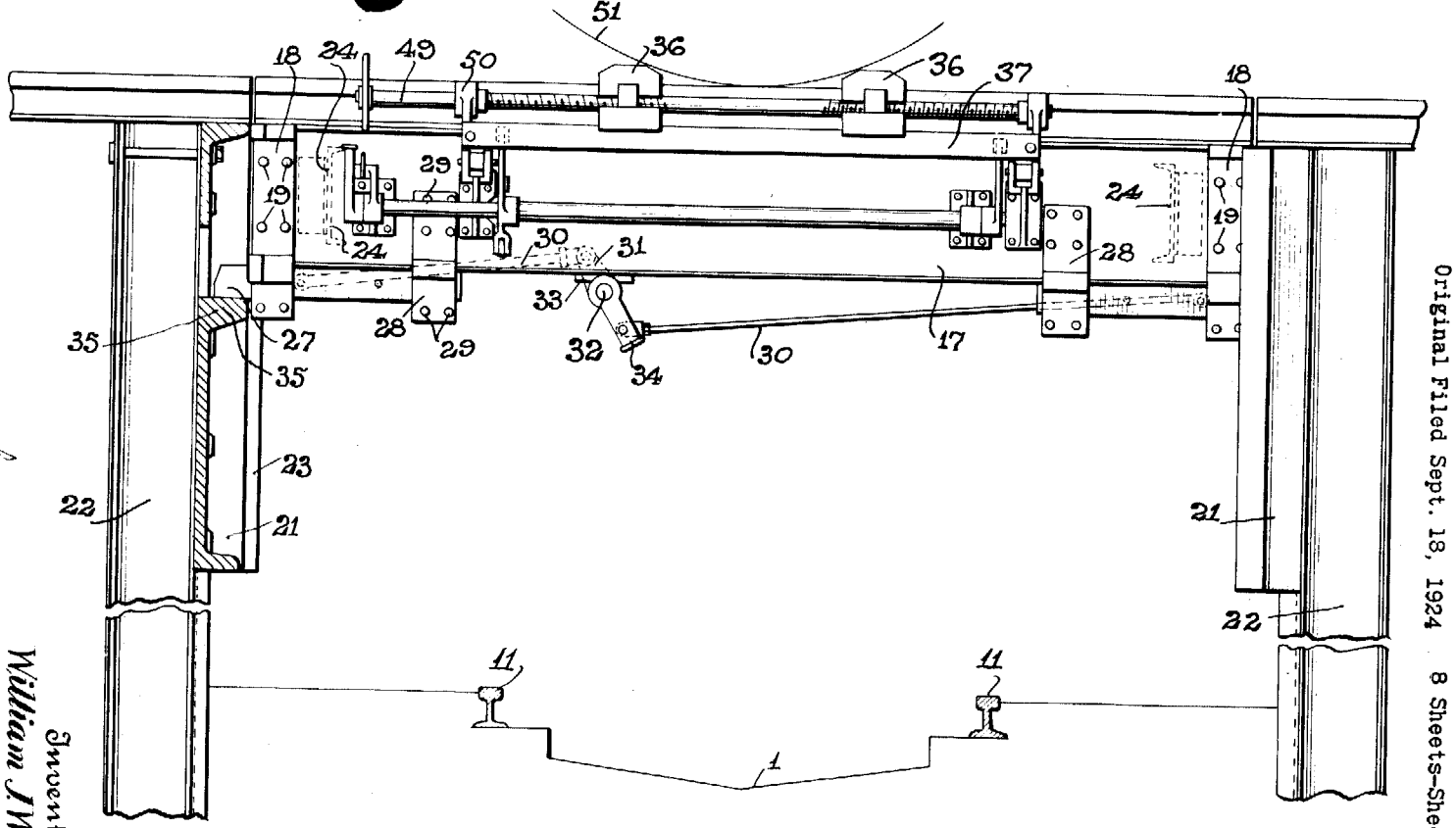
Fig. 9 is a side elevational view of the transfer table and drop pit sides viewed from a position below Fig. 1.

Referring first to Fig. 8 which is a plan view of the transfer table and shows also how the trackway 4 and the trackway 3 having rails 13 and 14 communicate and aline with rails 15 and 16 on the transfer table: The rails 15 and 16 are adapted to support the load and permit it to be rolled off and onto the transfer table. Each as shown in Fig. 9 is supported preferably by an I-beam or structural member, as 17. The I-beams 17 are cross-connected by the transverse members 24, as best shown in Fig. 8 and by rather broad and deep intermediate transverse member 25, both members 24 and 25 being rigidly connected to said beams 17. In order to obtain increased rigidity of the transfer table diagonal bracing 26 is suitably connected with the several members by approved structural methods well known to structural steel workers.

By the construction described it will be seen that a transfer table is provided which is of very substantial and rigid construction and is thoroughly braced so as to remain inflexible and rigid under the great loads which may be put upon it.

Secured to each end of each I-beam 17, as best shown in Fig. 9, are bearing plates as 18, one pair being located at each corner and one of each pair being on one side of the I-beam 17 and the other of the same pair being on the other side of the I-beam 17, both being securely fastened to the I-beam 17 by rivets 19, best shown in Fig. 9, and suitably formed as best shown in Fig. 8, with bearing surface projections 20 to engage with guides as 21. The guides 21 are secured in any suitable manner, as by bolting, to the upper ends of fixed upright I-beams or structural members 22 mounted in the sides of the pit and best shown in Fig. 9 and also shown in Fig. 8. The guides 21 have bearing surface 23 cooperating with the bearing surface projections 20 of the members 18 so that as the transfer table is raised and lowered by means hereinafter more fully described, it will traverse a strictly vertical path without side or end motion until it has so far descended that the members 18 are free from the guides 21, whereupon the transfer table may be moved horizontally and transversely to the trackways 3 and 4. These guides are provided in the pit at the place of interruption of each of the two or more lines of track which run up to and are interrupted at the pit.

Preferably the transfer table carries beneath it a wide socket 52 attached to or forming a part of the central connecting member 25. This socket shown in Fig. 10 and also in Fig. 8, is adapted to fit upon or receive the head 53 of the jack. In case the jack is hydraulically actuated the head 53 is attached to a ram or plunger 54 which serves as a means for the raising and lowering of the transfer table and for supporting the same while it is being moved transversely to the trackways 3 and 4. The jack is mounted, operated, controlled and traversed in the manner to be presently described.

In order to maintain the transfer table independently of the lifting devices in such position that rails 15 and 16 will be on the same level and properly aline with the interrupted lines of rails 13 and 14 while a vehicle is being positioned thereon or the load is being rolled onto or off the rails 15, 16, supplemental supporting means for the transfer table are provided. This consists preferably of bearing bolts as 27 well shown in Fig. 9 and also well shown in the lower lefthand corner of Fig. 8. One of these bearing bolts is positioned at each corner of the transfer table and slides on guideways or guide blocks one of which may be formed on or attached to a member 18 below the I-beam 17 and the other of which is formed by the bolt guide pieces 28, one of which is fastened to one side of the I-beam and the other of which is fastened to the other side of the same I-beam, both being rigidly held together with through and through rivets both through the I-beam and at the lower ends of the guide pieces. Each of the bearing bolts as 27 is connected to one end of a link as 30. These links are shown in elevation in Fig. 9 and in plan in Fig. 8. The other end of each link is connected to a crank arm as 31, best shown in Fig. 9, fixed on a rock shaft 32. This shaft 32 is supported in bearings as 33 properly in bearing on the under side of the I-beams.

A socket member 34 on the crank arm 31 is adapted to receive a bar by which the shaft 32 may be rocked and the links 30 caused to move longitudinally and thus throw both the bearing bolts into locking or unlocked position. If the bearing bolts are moved away from each other when the table is in elevated position they are guided by their guides so as to rest upon a suitable ledge or support as 35 which may form part of the guides 21. In this position the transfer table is supported rigidly and independently of the jack with the rails 15 and 16 on a level with and in alinement with the rails 13 and 14. When it is desired to lower the transfer table the bearing bolts are withdrawn from contact with the bearing projections 35, but of course this cannot be done except when the table has been slightly raised by the jack as will be hereinafter more fully explained. Similar bearings or ledges are provided in the pit at the interruption of each of the two or more lines of track with which the pit jack cooperates.

As it is essential for proper and safe operation that any part having a tendency to roll when positioned on the transfer table and when the transfer table is being shifted or traversed should be so blocked that it cannot move, blocking mechanism is provided. This blocking mechanism is positioned adjacent each rail as 15 and 16 of the transfer table and normally outside thereof. It may be of the same construction on both sides of the transfer table.

There are two blocking gibs 36 for each rail 15 and 16 and all four are shown in Fig. 8. Each blocking gib is supported by and works along two parallel rails 37. These parallel rails at each end are attached to and supported by a carriage as 38, best shown in Figs. 10 and 11. The carriages 38 provide for a movement of the gibs toward and away from the rails and have rollers as 39 journaled therein to bear upon a bracket member as 40 suitably fastened to an I-beam as 17, or other suitable support preferably on the table. The carriages 38 are four in number and are positioned as clearly shown by Fig. 8, each resting upon its bracket 40.

Figure 10:
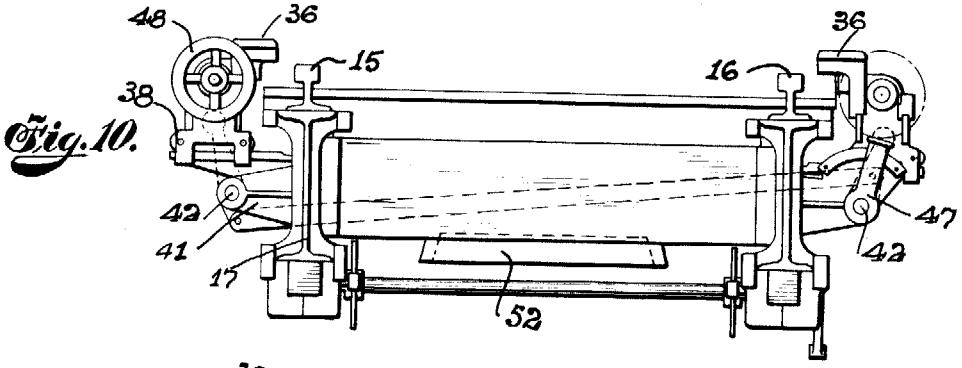
Fig. 10 is an end elevational view of the mechanisms of Fig. 9 viewed from a right-hand side of Fig. 9.
Figure 11:
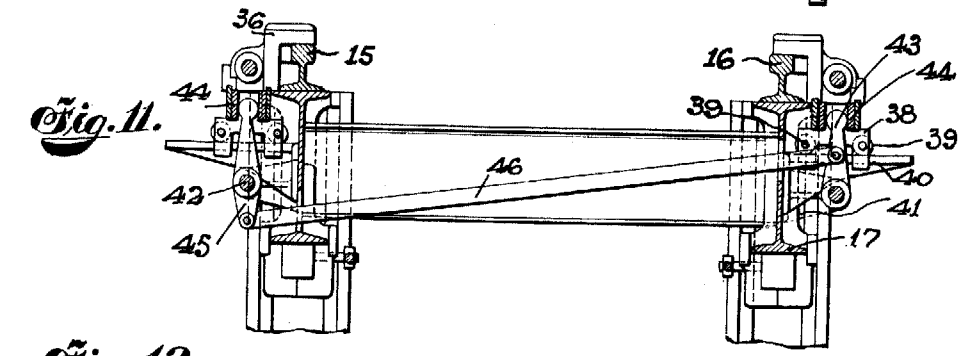
Fig. 11 is a view similar to Fig. 10, but with some of the parts in cross-section to more clearly show the construction.

The I-beams 17 or other part of the table as best shown in Figs. 10 and 11, also support each a pair of brackets as 41. These brackets, four in number, are positioned as most clearly shown in Fig. 8. The brackets, 41 are formed with an orifice which serves to journal a rock shaft as 42. This shaft is shown in section in Fig. 11 and in plan in Fig. 8. The rock shafts 42 bear crank arms. Those on one side, as shown by Fig. 11, and designated 43, extend upwardly and have an enlarged upper end which fits in between the two rails 37. Preferably wear plates 44 are interposed between the rails and the enlarged head of the arm 43. One of the crank arms 45 on the other side, as shown in Fig. 11, is in the form of a two-arm lever attached to the shaft 42. Its lower end serves as a connection by means of link 46 to arm 43 so that a movement of arm 43 causes a simultaneous movement of the arm 45 and so of the shaft 42 upon which it is mounted in an opposite direction to that imparted to the shaft upon which 43 is mounted. As shown by Fig. 10, the shaft 42 on the right-hand side of the figure bears a socket arm 47. This socket arm is adapted to receive a radial operating bar operating in a vertical plane to cause an oscillation of shaft 42 and of its arms 43 and, by link 46, a simultaneous movement of shaft 42 on the lefthand side of Fig. 11 and the corresponding arms 45 of the latter. Thus the gibs carried by the rails 37 at opposite sides of the table are caused to move simultaneously toward and onto the rails 15 and 16 or off from and away from the rails.

When the blocking gibs 36 are positioned on the rails, they may be made to approach or recede one from the other by an operation of hand wheels as 48, shown in elevation in Fig. 10 and also shown in Fig. 8. The hand wheels 48 are each mounted on a shaft as 49, journaled in an arm 50, as best shown in Fig. 8, which is attached to a carriage as 38. Adjacent the gibs the shafts 49 are each formed with a screw thread which engages in a nut formed in or on the gibs. The screw threads adjacent one gib are righthanded and those adjacent the other gib on the same shaft 49 are lefthanded so that a rotation of shaft 49 by hand through 48 causes the gibs to approach to or recede from one another. By this means the gibs may be positioned on the rails 15 and 16 and as shown by Fig. 9, to closely engage and block any wheel on the rails. In Fig. 9 a fragment of the periphery of a wheel is indicated by line 51.

By employing guiding means as described for each corner of the transfer table, the table when in vertical motion will describe a true vertical path. The bearing bolts which maintain the transfer table in position such that the rails thereon are on a level with and will aline with connecting lines of track obviously may be operated simultaneously by a single lever but might be operated singly or in pairs. Also it is obvious that the socket member 34 might be located to allow operation from other positions.

The traversing carriage supporting the jack, pump and motor for operating the pump and the drive for the carriage may be of any desired construction and provided with four wheels. The wheels are in pairs on axles as 55 and 56, which axles are journaled in a frame preferably of cast steel, which frame includes side members 57 and 57′ joined about midway of the carriage by a transverse orificed member 58, shown in section by Fig. 4.

Figure 4:
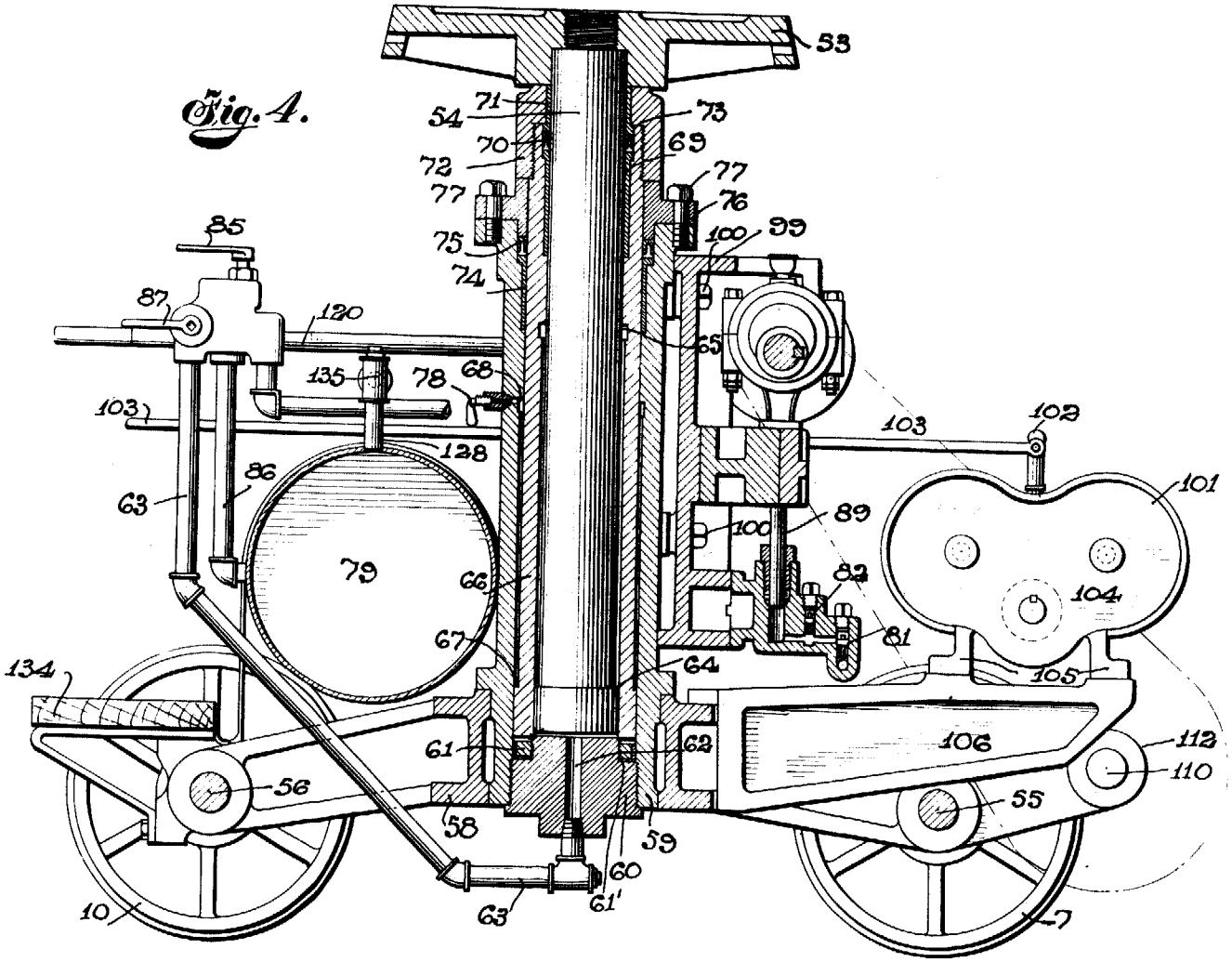
Fig. 4 is an other view of the mechanism as shown by Fig. 3, viewed from the same position but with many of the parts in cross-section so as to more clearly show internal construction.

Within the orifice formed in the transverse member 58 of the carriage frame is positioned a cylinder 59, best shown in Fig. 4. This cylinder has an open lower end as shown, which lower end is closed by a plug 60, the connection being formed by screw threads on the plug and screw threads on the cylinder. The plug 60 has a screw-threaded reduced portion at its upper end with which engages a screw-threaded annulus 61 which holds the gasket 61′ in place. The plug 60 also has a central orifice 62 therethrough which connects with a pipe 63, which pipe, hereinafter more fully described, delivers the fluid under pressure. When fluid is delivered under pressure to the orifice 62 it forces the ram upwardly. When the ram has been forced upwardly so far that the shoulder 64 thereon contacts with shoulder 65, then the elongated annulus or sleeve 66 starts moving upwardly and continues to move upwardly until the shoulder 67 thereon contacts with the shoulder 68. The head 53 is then at the very highest point to which it can be raised. In order to insure as long life as possible before repairs are needed and to prevent leakage as much as possible, applicant has provided a guide bushing 69 preferably of metal of high wear resisting characteristics such as bronze at the point where the ram 54 emerges from the sleeve 66 and just above this bushing a packing or gasket is positioned, which is held in place by another bronze bushing 71, which in turn is held in place by a threaded sleeve 72 threaded for engagement with the upper threaded end of the outer member of the telescoping sleeve 66. By means of the shoulder 73 cooperating with a like shoulder of the bushing 71, the bushing 71 is forced down against the packing 70 so as to prevent fluid from flowing up past the packing.

In order to prevent leakage and to insure long life, the upper end of the cylinder 59 is provided with a guide bushing for the outer telescoping member of the ram and preferably of bronze, designated 74 and above this bushing is an enlargement of the cylinder which receives a packing or gland 75. In order to retain the packing in place a flanged annulus 76 is provided and attached by means of cap screws 77 to the cylinder 59.

As air will at times be trapped above the flange of the outer or sleeve member 66 a vent therefor is provided to allow this air to escape when desired.

Mounted on the carriage with the hydraulic jack is a tank 79 holding the operating liquid which can be either water or oil and which supplies liquid to the hydraulic pump by which the jack is hydraulically lifted. The liquid is supplied from the tank to the pump through any suitable pipe as for instance pipe 80 joined to the inlet of the pump. The pump itself being provided with a plurality of plungers 89 and 90, said connection is made to a manifold having suitable inlet valves, one for each plunger. One of said inlet valves is indicated at 81. A similar manifold carries the outlet valves one for each plunger, one of said outlet valves being marked 82 in Fig. 4. From the outlet manifold of the pump, pipe 83 connects as shown in Fig. 5 with the body 84 of a valve having an operating valve handle 85. This valve serves in one position to pass the fluid leaving the pump under pressure through the outlet manifold, to a valve 87 by means of which the liquid under pressure may be passed through the pipe 63 connected with the bottom of the cylinder in which the telescopic hydraulic ram or plunger carrying the jack head 53 works. When the valve is in one position the hydraulic pump and ram work in the normal fashion to apply lifting force to the head 53. In the other position the two-way valve 84 which cuts off the connection from the pipe 83 to a valve 87 or whose handle is indicated at 87 opens up the connection between pipe 63 and a pipe 86 joined to the tank 79 so that the liquid forced into the pipe 63 by the action of the pump will be returned directly to the tank instead of passing to the hydraulic ram portion of the apparatus through pipe 63.

Fig. 14 shows in diametric fashion and in conventional form the connections between the various pipes 83, 86 and 63 and valves 85 and 87 adapted to function in the manner just described.

In the position shown in Fig. 14 it is obvious that the liquid passes from pipe 83 to pipe 86 and to the tank, the connection from 83 to valve 87 and pipe 63 being blocked. Obviously the valve 87 might be turned to shut off the connection with pipe 63. By controlling, however, the valve 85, connection with pipe 86 may be shut off and connection established between 83 and, through valve 87, when properly set, with pipe 63. By setting the valve 85 or 84 to connect pipe 83 directly with the tank through pipe 86 a bypass is provided whereby the fluid taken from the tank to and through the pump may circulate back through the tank so that the pump may idle when its driving motor, as will be presently described, is applied to operating the driving mechanism for traversing the carriage in the pit. Furthermore, this bypass is useful in starting the motor since less power is required when the pump is practically idling than when it is loaded and is forcing liquid against the ram.

By shifting the valves 85, 84, the fluid passes directly from the pump under pressure into the pipe 63 and the jack head is raised by the fluid pressure. When the jack head has been raised it may be lowered with the load by adjusting the valves 87 and 85 so that the plunger may drop and cause the liquid beneath the same to be returned to the tank through pipe 63, valve 87 and valve 85 and pipe 86, the latter valve having been turned to establish the connection from 87 to 86 and preferably to close the connection from 83 leading from the pump. During this operation it will be understood that the pump is not operated. When the valve 87 is turned to close the connection to pipe 63 it will be obvious that the liquid under pressure of the ram will be trapped and the head will be held in lifted position by the confined body of liquid which is practically incompressible. Obviously the same effect of holding the load lifted is obtained by simply setting the valve 85 to position shown in Fig. 14, the pump in such case idling as before described while the power of the motor is applied to the driving mechanism for traversing the carriage.

As applicant's construction of a pit jack embodies a movable carriage and as applicant prefers the use of air to operate the motor supplying power for moving the carriage and operating the ram, there has been provided a pipe 129 or other conduit for a motive power agent to which connection may be made to a source of compressed air or other motive power agent in any of the well known and thoroughly understood ways, such as by a coupling 130 for a flexible air hose. The air entering pipe 129 may be passed to valve 127 and be used as hereinafter described to operate the ram or it may pass to valve 131 and if such valve is open, to pipe 132 and thence to the air motor 101.

In order to raise the jack head quickly to position to engage the work without operation of the hydraulic pump, provision is made for applying air pressure to liquid in the tank 79 to apply hydraulic lifting pressure to the ram. The same may also be used when the load is light and it is desired to expedite the operations of the pit jack. This is accomplished by means of the valve 127 which serves to open the direct connection between the conducting pipe supplying the motive power medium such as compressed air to the motor and a pipe 128 leading into the air space in the tank. If at such time the valve controlled by handle 87 is properly positioned or in position shown in Fig. 14 and valve 85 is turned to connect 87 with 86 the liquid under pressure applied by air admitted through pipe 128 passes to the ram and lifts load 53.

Figure 7:
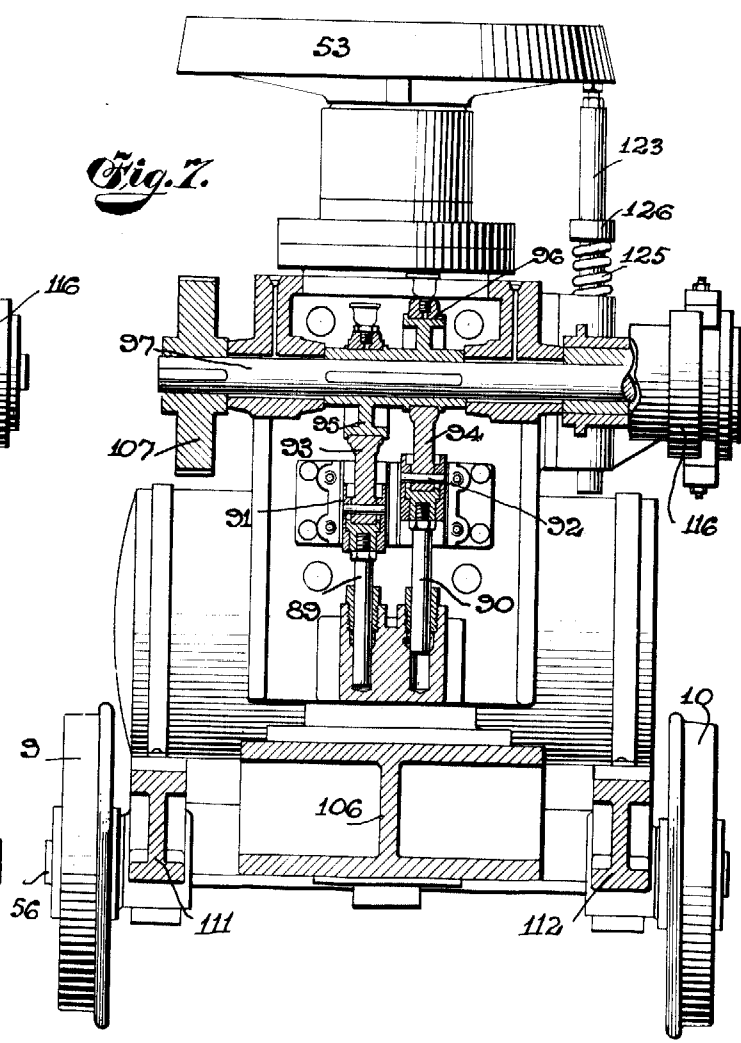
Fig. 7 is a view of the mechanisms of Fig. 5 from the same position as that of Fig. 6, but with many of the parts in cross-section so as to more clearly show internal construction.

When the valves are operated or set to permit the jack head to fall or drop, the pump taking no part in the action, the air confined in tank 79 is permitted to exhaust through connection 135 connected to pipe 128 and exhaust valve indicated at 135. At such time the valve 127 is of course placed in proper position to cut off the supply of air under pressure to the air space of the tank. The liquid pump as shown in Fig. 7 is of the two-plunger type but obviously any number of plungers may be employed. The plungers work in cylinders which communicate each with its own set of inlet and outlet valves 81, 82 and they are mechanically operated in any desired way from a shaft 97 suitably coupled with the driving motor 101 on the carriage. For operation from shaft 97 the plungers are preferably connected at their upper ends to cross-heads 91, 92 which are joined by suitable wrist pins with eccentric straps 93, 94 cooperating with eccentrics 95 and 96 mounted on shaft 97. The pump and the driving mechanism referred to may be mounted on the traversing carriage by attachment to a frame 99 which may be bolted by bolts 100 to the side of the ram cylinder 59 as better shown in Fig. 4.

The pump and its attachments might, however, be secured by other means to any other portion of the carriage or parts mounted thereon so as to traverse with the carriage jack. The motor 101 has a drive connection with the pump of any suitable kind or form which will be presently described. A drive connection with the wheels for the carriage is also provided.

The air motor, the details of which are not shown, is of any desired form suitable for being driven by compressed air and is also of the type having a control rod 102 as shown in Fig. 4 whereby through the action of a manually operated rod 103 the direction of rotation of the motor shaft 104 may be reversed. Such matters being old and well known in the art, it is not necessary to illustrate and describe the details thereof. The air motor is also supported on the traversing carriage in any desired way as for instance by the lugs 105 carried by a base 106 which is secured in any desired way to the central portion 58 of the carriage or carriage frame. The drive whereby the air motor operates the hydraulic pump may be of any desired construction or form suitable for the purpose. It may be constructed as follows:

The shaft 104 of the motor at one end bears a sprocket chain wheel which by means of sprocket chain indicated in dotted lines at 104′ drives sprocket chain wheel 107 keyed to shaft 97 so that a rotation of shaft 104 is communicated to shaft 97, and so to the eccentrics 95 and 96 thereon, thereby causing an operation of the pump plungers. From the description given above it will be readily understood then that in order to raise the head 53 of the jack it is merely necessary, assuming that air is supplied to motor 101, to manually operate the control rod 102, whereupon the air motor 101 will cause its shaft 104 to revolve and this in turn will cause an operation of the pumps which will draw liquid from the tank 79 and force the same through the pipe 63, assuming valves 85 and 87 are properly positioned, and so cause the operation of raising the head 53.

The drive for the carriage wheels or some of them and whereby the carriage may be traversed in either direction may likewise be of any desired character and controllable preferably by an attendant on the carriage. A form suitable for this part of the apparatus comprises the following parts:

Gear wheel 108 is mounted on one of the carriage axles 55 and is adapted to mesh with a pinion 109 positioned on the shaft 110 journaled for rotation in protruding ends 111 and 112 of the side frames 57 and 56. A sprocket wheel 113 on shaft 110 at the other end thereof has a sprocket chain 114 driven from sprocket wheel 115, whose drive connection with shaft 97 is controlled by a clutch designated as a whole by 116. When the clutch is thrown, the shaft 97 communicates motion to sprocket wheel 115 and this in turn, through sprocket chain 114, sprocket wheel 113, shaft 110, pinion 109 and gear wheel 108, transmits motion to axle 55 to move the carriage in a direction predetermined by the setting of motor control device 102 and resultant direction of rotation of the motor shaft 104.

Figure 3:
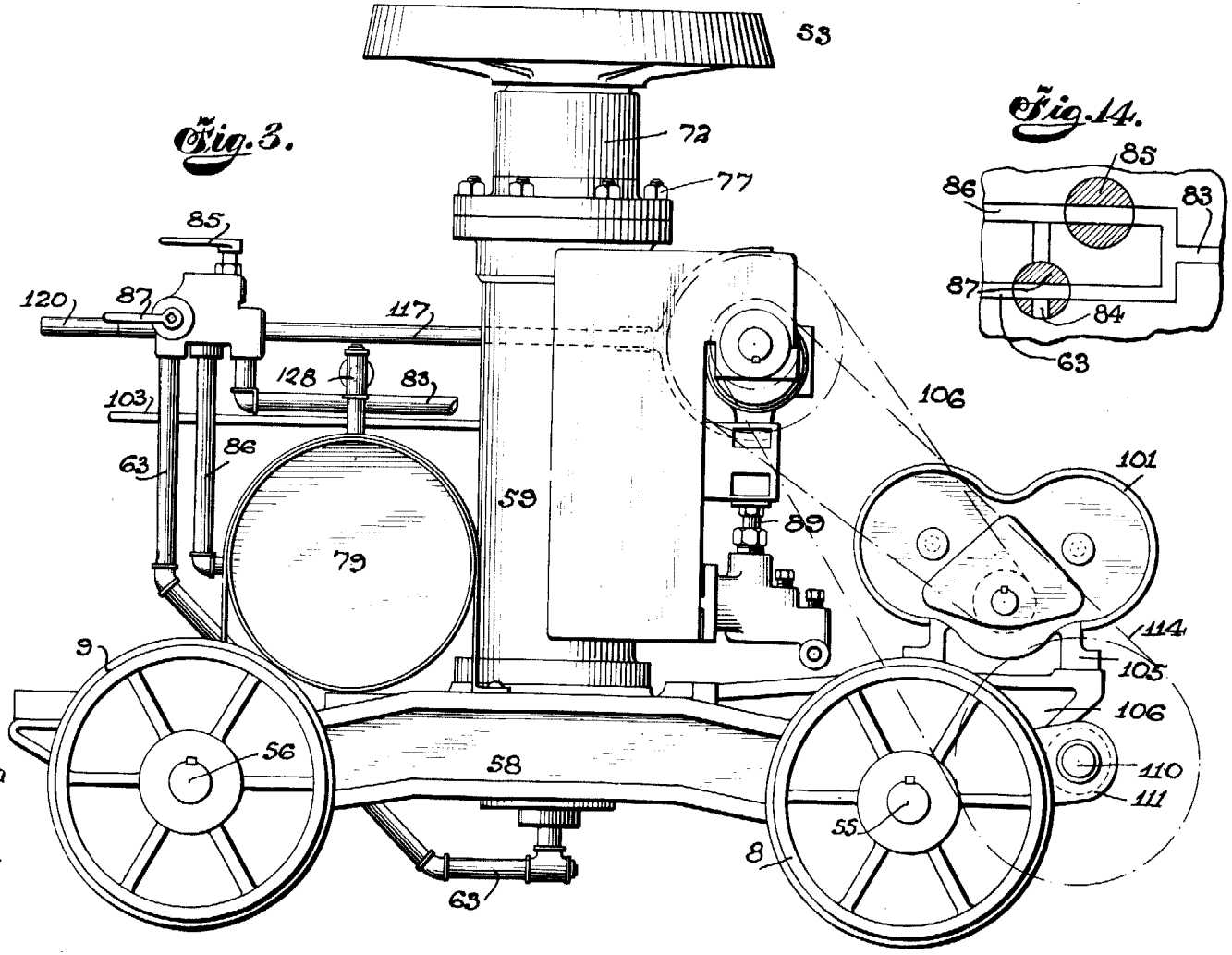
Fig. 3 is a side elevation of the raising and lowering and traversing mechanism as shown positioned in the pit in Fig. 2 as viewed from the left hand side of Fig. 2.
Figure 6:
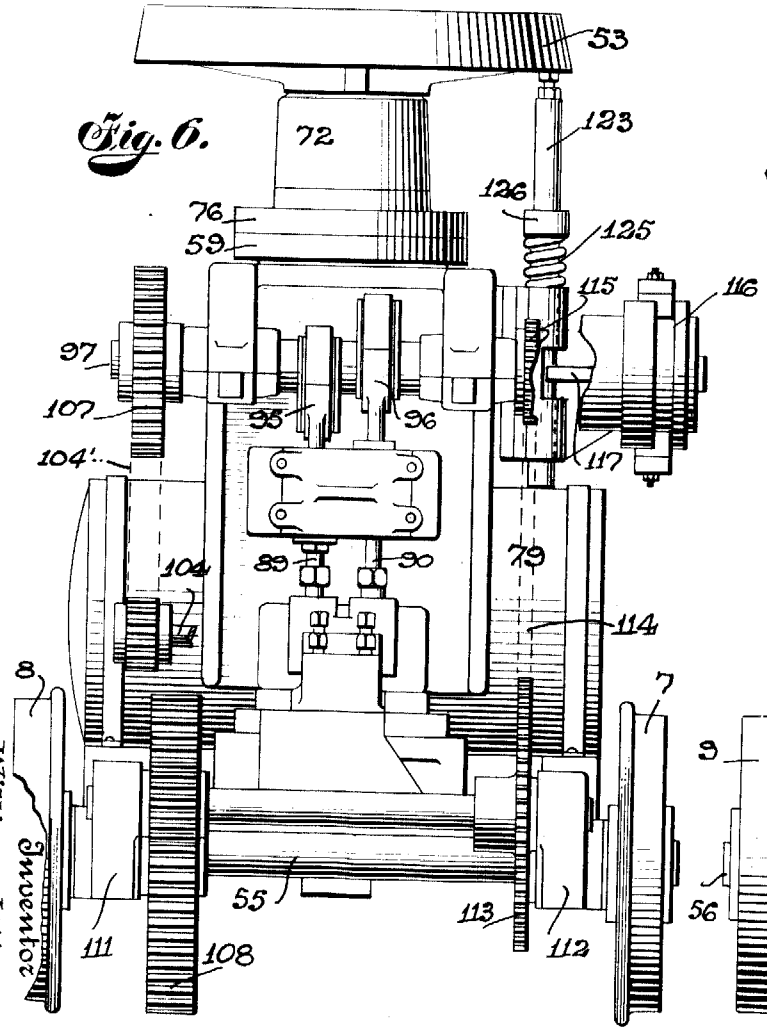
Fig. 6 is an end view of the mechanisms as shown by Fig. 5, viewed from the right-hand end as illustrated by Fig. 5.
Figure 13:
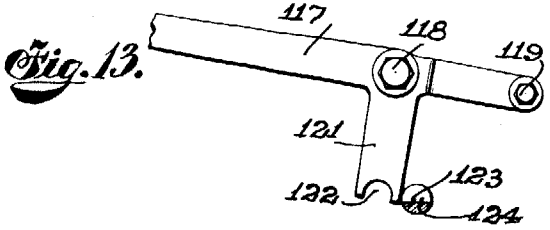
Fig. 13 is a view similar to Fig. 12 but with the control lever shown in a different position.
Figure 12:
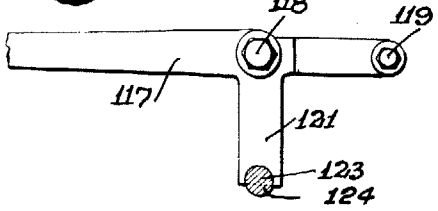
Fig. 12 is a detailed view illustrating the locking of a control lever used in traversing the lowering and raising mechanism carriage.

The operation of clutch 116 is effected by lever 117 pivoted at 118 and engaging at 119 with the clutch. This lever by means of handle 120 may be manually operated, but in order to prevent operation of the carriage while the head 53 of the ram is in a position other than that shown by Figs. 3, 6 and 7, the lever 117 is provided with an extension at right angles thereto, designated 121 and provided as shown by Figs. 12 and 13, with a semi-circular cutout portion designated 122. This semi-circular cutout portion 122 is of the proper size to allow pin or plunger 123 to reciprocate vertically therein, but a movement of the lever 117 is prevented except when the projection 121 is in the same plane with a slot 124, indicated in Fig. 13. This slot is only in the same plane with the projection 121 of the lever 117 when the head 53 is in its lowest position, as shown by Fig. 6. At that time the head 53 pressing against plunger 123, forces it downwardly against the tension of the spring 125 and bearing against the collar 126 attached to plunger 123. This construction provides a safety feature in that unless the head 53 is at its lowest point, it is impossible to move the lever 120 to cause the clutch 116 to so engage the shaft 97 and the sprocket wheel 115 as best shown in Fig. 5, as to cause the sprocket wheel 115 to rotate and so through the connections hereinbefore described cause the pit jack carriage wheels to revolve and traverse the jack.

In order to prevent an excessive pressure when the hydro-pneumatic pump is operating, a safety valve 133, best shown in Fig. 5, is used which may be of any well known and approved form and which is connected to the discharge end of the hydro-pneumatic pump.

I have provided an automatic air release valve 135, Fig. 5, which may be of any of the usual or preferred forms and serves to relieve excessive air pressure in tank 79.

For the operator of the pit jack a standing board 134 as best shown in Fig. 4 may be provided. This standing board is supported by the pit jack carriage frame and allows the operator to stand thereon and to be transported together with the parts removed from a vehicle. All of the controls are positioned in such wise that they may be readily reached by the operator while standing upon the standing board 134 and from his position on this board he may also insert the lever required to operate the socket lever 34 as shown in Fig. 9 for the purpose of unlocking the transfer table so that it may be lowered and he may likewise, from the same position, operate the hand wheels 48 for the purpose of adjusting locking gibs 36 to proper position, although this would perhaps best be done by the workman situated on the level of the trackway 3 and 4, who would also operate the socket lever 47 to throw the gibs onto the rails.

It is to be understood that when the head 53 is raised by the ram it contacts with and fits snugly within the member 52 of the transfer table and that the parts are of such size and so disposed that when the transfer table is loaded it will in spite of its load rest securely upon the head 53 without danger of overturning. In order to be quite certain of this the member 52 is recessed quite fairly deeply as shown in Fig. 10.

Applicant has described his jack as being operated by air motor, but of course it is to be understood that any other suitable type of motor and any other motive power agent therefor may be substituted therefor. It is also to be understood that the fluid contained in tank 79 is present in such quantity as to supply the maximum requirements of the device and that it may be water or any of the well known fluids usable for such purpose as hydraulic jack operation.

It is also to be understood that applicant's jack may or may not be provided with a head as 53. In some cases the jack may be used without the transfer table T. In such case a suitable member would be placed upon the plunger 59 to provide for the different method of use.

In Figs. 8 and 9 applicant has illustrated an I-beam 22 as being positioned at each corner of the transfer table. This is the preferred construction since it provides a substantial bearing for the ends of the rails as 13 and 14 of the approaching trackway and insures that the rails of the transfer table and the rails of the approaching trackway will be maintained permanently in alinement and at the same level as the locking bolts 27 cooperate with bearing surfaces which are rigidly bolted to the I-beams 22.

Although I have particularly described the construction of one physical embodiment of my invention, and explained the operation and principle thereof, it is to be understood that the invention might be embodied in other forms of apparatus.

What I claim as my invention is:

1. In a drop pit jack, in combination a wheeled carriage, a motor supported by the wheeled carriage, means for driving the wheeled carriage by the motor, an hydraulic jack supported by the carriage, a transfer table above the jack carrying load-receiving rails and adapted to be engaged and lifted by the jack or disengaged at will, and means for operating the jack by the motor.

2. In a drop pit jack, in combination a wheeled carriage, a motor supported by the wheeled carriage, means for driving the wheeled carriage by the motor, a jack supported by the carriage, a transfer table above the jack carrying load-receiving rails and adapted to be engaged and lifted by the jack or disengaged at will, and means for operating the jack by the motor.

3. In a pit jack, the combination with a surface railway track pit, a surface railway track interrupted at the top of the pit and beyond one side of which said pit extends, and rails in the pit forming a sub-surface pit track crossing the line of the surface track, of a surface-track-completing device including a pair of parallel rails upon which the load may be rolled, means for releasably holding said device at the top of the pit against downward, sidewise and longitudinal movements relatively to the surface track with said pair of rails in surface-track-completing position, a wheeled carriage in the pit on the sub-surface track, means on the carriage for supporting said surface-track-completing device for transportation by the carriage transversely of the surface track and movable with the carriage beneath said releasably held device, and means on the carriage for lifting said supporting means into supporting engagement with said device.

4. In a pit jack, the combination with a surface railway track pit, a surface railway track interrupted at the top of the pit and beyond one side of which said pit extends, and rails forming a sub-surface track in the pit crossing the line of the surface track, of a surface-track-completing device including a pair of parallel rails upon which the load may be rolled, shiftable supports for said device mounted on the device, fixed supports independent of said device having surfaces over which said shiftable supports are engageable to sustain the device against downward movement relatively to the surface track with said pair of rails in surface-track-completing position and surfaces cooperative with the device when sustained by the shiftable supports to hold the device against movement transversely of the surface track, means on said device for simultaneously moving said shiftable supports into and out of sustaining position, a wheeled carriage in the pit on the sub-surface track, means on the carriage for supporting said surface-track-completing device for transportation by the carriage transversely of the surface track and movable with the carriage into position beneath said temporarily held device, and means on the carriage for lifting said supporting means into supporting engagement with the releasably held device.

5. In a drop pit jack, the combination with a track pit and two or more lines of surface railway tracks interrupted at the pit, of a pit track extending transversely of the surface tracks, a transfer table including load-receiving rails arranged to complete either surface track, a plurality of supporting devices shiftably held to the table adjacent opposite sides of the table for movement in the plane of the table into and out of table-supporting position, said table having guides engaging under and over each of said supporting devices, fixed supports in the pit adjacent each surface track having surfaces over which said shiftable supports are adapted to be engaged to sustain the table against downward movement with its rails in position to complete a selected surface track, a carriage running on the pit track, and a jack on the carriage having a head separably engageable with the table to raise and lower the table relatively to the surface tracks and support the table for transportation by the carriage while lowered in the pit.

6. In a pit jack of the character described, the combination of a transfer table, vertical guides for the transfer table in the side of the pit, a carriage supporting the transfer table and adapted to be traversed in said pit on rails therein, and a jack on the carriage for lifting and lowering the transfer table.

7. In a pit jack of the character described, the combination with a transfer table working vertically in the pit, of vertically disposed guide members mounted in the sides of the pit and adapted to guide the transfer table in its movement, supporting ledges on each said guide member for temporarily supporting the transfer table, a traversing carriage on which the transfer table is mounted, and means on the carriage for lifting and lowering said transfer table.

8. In a pit jack of the character described, the combination with a transfer table working vertically in the pit, of vertically disposed guide members mounted in the sides of the pit and adapted to guide the transfer table in its movement, supporting ledges in the sides of the pit for temporarily supporting the transfer table, a traversing carriage on which the transfer table is mounted, and means on the carriage for lifting and lowering said transfer table.

9. In a pit jack of the character described, the combination with a transfer table working vertically in the pit, of vertically disposed guide members adapted to guide the transfer table in its movement, supporting ledges for temporarily supporting the transfer table, a traversing carriage on which the transfer table is mounted, and means on the carriage for lifting and lowering said transfer table.

10. In a drop pit jack of the character described, a drop pit having four vertically disposed structural members anchored in its sides, one at each corner of a rectangle, a transfer table including two spaced cross-connected parallel structural members, bearing members attached on each side of each end of each of the spaced parallel members, and guides cooperating with said bearing members and attached to said vertical structural members.

11. In a drop pit jack of the character described, a transfer table working vertically therein in combination with four vertically disposed guide members arranged in the sides of said pit to form corners of a rectangle, ledge members on each guide member for carrying the load of the transfer table, and slidable bolts mounted on the transfer table and adapted to be slid into and out of position for engagement with the ledge members.

12. In a drop pit apparatus of the character described, the combination of a vertically operable transfer table and jack therefor, a traversing carriage supporting said jack, vertically disposed guides in the sides of the pit arranged to form corners of a rectangle and operating as guides for the transfer table in its vertical movement, slidable locking bolts one on each corner of the transfer table adapted to rest upon a suitable support when projected for sustaining the transfer table and load in any of the positions of transfer of the carriage, and means for operating said locking bolts simultaneously.

13. In a drop pit jack, the combination of a transfer table, a table traversing carriage, means on the carriage separably engageable with the table for raising and lowering the table and supporting the same for traversing while lowered, sets of endwise slidable bolts at opposite sides of the table, slide bearings for said bolts on the table guiding said bolts to move laterally of the table, and means on the table for projecting said sets of bolts outward simultaneously for engagement thereof over fixed supporting means to sustain the table in lifted position independently of the carriage and the table lifting and supporting means on the carriage.

14. In a drop pit jack, the combination with a track pit and a surface railway track interrupted at the top of the pit, of a transfer table transporting carriage traveling in the pit, a transfer table having surface-track-completing rails rigidly mounted thereon, pairs of horizontally-slidable bolts held to the table at opposite ends of the table directly under the table rails and extending and slidable longitudinally of said rails, fixed supports in the pit having upwardly-facing surfaces located in the vertical longitudinal planes of the surface track rails over which said bolts are projected to releasably sustain the table with its rails registering with the surface track rails, and a vertically-shiftable table support on the carriage separably engageable under the table for sustaining the table during transportation in the pit and for lifting the table to and lowering it from surface-track-completing position.

15. In a drop pit jack, the combination with a track pit and a surface railway track interrupted at the top of the pit, of a transfer table transporting carriage traveling in the pit, a transfer table having surface-track-completing rails rigidly mounted thereon, pairs of horizontally-slidable bolts held to the table at opposite ends of the table directly under the table rails and extending and slidable longitudinally of said rails, fixed supports in the pit having upwardly-facing surfaces located in the vertical longitudinal planes of the surface track rails over which said bolts are projectible to releasably sustain the table with its rails registering with the surface track rails, a vertically-shiftable table support on the carriage separably engageable under the table for sustaining the table during transportation in the pit and for lifting the table to and lowering it from surface-track-completing position, and fixed means cooperative with the table while the table is sustained by the bolts to hold the table against lateral movement transversely of the surface track.

16. In a drop pit jack, the combination with a track pit and a surface railway track interrupted at the top of the pit, of a transfer table transporting carriage traveling in the pit, a transfer table having surface-track-completing rails rigidly mounted thereon, pairs of horizontally-slidable bolts held to the table at opposite ends of the table directly under the table rails and extending and slidable longitudinally of said rails, fixed supports in the pit having upwardly-facing surfaces located in the vertical longitudinal planes of the surface track rails over which said bolts are projectible to releasably sustain the table with its rails registering with the surface track rails, a vertically-shiftable table support on the carriage separably engageable under the table for sustaining the table during transportation in the pit and for lifting the table to and lowering it from surface-track-completing position, said fixed supports having elements rigidly held thereto and located adjacent the top of the pit cooperative with the table while it is sustained by the bolts to hold the table against lateral movement transversely of the surface track, the table being releasable from said elements by lowering thereof with the vertically-shiftable table support on the carriage to permit traversing of the table in the pit crosswise of the surface track.

17. In a pit jack, the combination of lines of track interrupted at the pit, a traversing carriage running in the pit transversely to said lines of track, a jack and operating mechanism therefor mounted on the carriage, a transfer table adapted to be engaged and supported by the jack during traverse of the carriage, and carrying rails adapted to aline with said tracks, and means in the pit for supporting the table independently of the jack.

18. In a drop pit jack of the character described, the combination with a transfer table having two spaced cross-connected parallel structural members and bearing members attached on each side of each end of each of said spaced parallel members, four vertically disposed structural members anchored in the sides of the pit one on each corner of a rectangle, and guides attached to said vertical structural members and cooperating with said bearing members.

19. In a pit jack of the character described, the combination with a transfer table having rail supporting beams structurally embodied therein, of supporting bolts working in sockets beneath the beams and adapted to engage with fixed supports in the pit sides for taking the load on the rails when the jack is not in action.

20. In a railway pit jack, the combination of a jack having a single lifting head, a wheeled carriage for the jack, a non-rotatable transfer table adapted to be lifted and supported solely by said head, surface-track-completing rails held to said table and extending crosswise of the carriage, and laterally adjustable means carried by the table for supporting the table fixedly in position as a track bridge across the pit and independently of the action of the jack.

21. In a drop pit jack, the combination with a track pit, a surface railway track interrupted at the top of the pit, and a track in the pit extending transversely of the surface track, of a transfer table provided with surface-track-completing rails and shiftable in the pit vertically and also transversely relatively to the surface track, wheeled means traveling on the pit track, having a table sustaining head adapted to receive the table and means for lifting and lowering said head, means fixedly held in the pit cooperative directly with the table upon elevation of the table from a lowered traversing position into surface-track-completing position for resisting horizontal movements of the table transversely of the surface track, shiftable temporary sustaining means carried by the table, and means fixedly held in the pit releasably engageable by said temporary sustaining means to support the table against downward movement from surface-track-completing position independently of the position of said wheeled means and the table sustaining head thereon.

22. In a drop pit jack, the combination with a track pit, a surface railway track interrupted at the top of the pit, and a track in the pit extending transversely of the surface track, of a transfer table provided with surface-track-completing rails shiftable in the pit vertically and also transversely relatively to the surface track, wheeled means traveling on the pit track, having a table sustaining head adapted to receive the table and means for lifting and lowering said head, fixed devices in the pit cooperative directly with the table to hold the table against horizontal movements with its rails in the vertical longitudinal planes of the interrupted surface track rails and between the vertical planes of the ends of the interrupted surface rails upon elevation of the table from a lowered traversing position, and shiftable means carried by the table releasably engageable over parts of said fixed devices to sustain the table against downward movement with its rails level with the interrupted surface track rails.

23. In a pit jack of the character described, the combination with a transfer table carrying two spaced parallel rails, of blocking gibs in spaced pairs one pair supported adjacent and outside of each rail, reciprocating supporting means for the gibs whereby the members of each pair may be moved towards and away from one another, and reciprocating means for moving each pair on to and off the rail adjacent thereto.

24. In a pit jack of the character described, the combination with a transfer table and two spaced parallel load-supporting rails carried thereby, of blocking gibs in spaced pairs one pair adjacent and outside of each rail, rails on which the gibs may slide towards and away from one another, supports for said rails, and means for reciprocating the supports to move the gibs on to and off of the rails.

25. In a pit jack of the character described, the combination with a transfer table and two spaced load-supporting rails carried thereby, of blocking gibs in spaced pairs one pair adjacent and outside each rail, two spaced parallel rails supporting each pair of gibs, carriages supporting the latter rails and movable to and from said load-supporting rails, and means on the table for supporting said carriages.

26. In a pit jack of the character described, the combination with a transfer table carrying two spaced parallel load-supporting rails, of blocking gibs in spaced pairs one pair positioned adjacent and outside of each supporting rail, rails supporting each pair of gibs, carriages supporting the latter rails and movable to and from the load-supporting rails, and a screw-threaded shaft for each pair of gibs, having right and lefthand screws engaging the two gibs of a pair respectively to cause them to approach or recede from one another.

27. In a pit jack of the character described, the combination with a transfer table provided with load-carrying rails spaced apart, spaced blocking gibs in pairs one pair positioned adjacent each rail, means carried by the transfer table for simultaneously moving all the gibs on to or off the rails, and means for adjusting the spacing of the gibs of each pair with relation to one another.

28. In a pit jack of the character described, a transfer table having two spaced parallel load-supporting rails and comprising two structural supporting members, one for each rail, cross-connections between said supporting members at their ends, and an intermediate crossing member provided with a cavity in its bottom adapted to receive and nest the head of the jack and hold the table against overturning.

29. In a drop pit jack of the character described, the combination of a transfer table carrying spaced load-supporting rails, means for lowering and raising the table, means for guiding the transfer table while being lowered or raised, independent means for holding the table in raised position independently of the jack, and vertical structural members located in the pit adjacent each corner of the table for supporting the table and the guiding means therefor.

30. In a pit jack of the character described, the combination with a transfer table and traversing jack for lifting the same, of a central supporting member on the bottom of the table, centering and detachably interfitting with the jack head and adapted to take the full pressure thereof.

31. In a pit jack of the character described, the combination with a transfer table composed of structural members and a tying member therefor consisting of a casting having a center adapted to be engaged by and receive the full pressure of the jack head.

32. In a traversing jack, the combination of a carriage, traversing mechanism, a motor, means for actuating either the jack or the traversing mechanism from said motor and means for preventing actuation of the traversing mechanism from said motor while the jack is extended.

33. In a traversing jack, the combination of a carriage, a motor supplying power to operate the jack, mechanism for applying the power of the motor to shifting of the carriage, and means connected to the jack for locking the carriage shifting mechanism while the jack is extended.

34. In a traversing jack, the combination of a lifting ram, a motor supplying power to operate the ram, a carriage supporting the jack and provided with a suitable driving gear for moving the carriage to traverse the jack, means for connecting the motor to said driving gear, and means governed by the ram for locking said connecting means out of action when the ram is lifted.

35. In a jack, in combination a wheeled carriage, a motor supported by the carriage, an hydraulic jack supported by the carriage and operated by said motor, means for driving the carriage by the motor, and means for preventing the driving of the carriage by the motor except when the jack is retracted.

36. In a jack, in combination a wheeled carriage, a motor supported by the carriage, means connecting the motor and the wheels of the carriage whereby the carriage is driven by the motor, including a manually operable lever and a clutch for operation by the lever, an hydraulic jack having a ram supported by the carriage, and means controlled by the ram for controlling the operation of the lever.

37. In a drop pit jack, the combination with a track pit, a wheeled jack traveling in the pit, and a surface railway track interrupted at the top of the pit, of a transfer table independent of the jack seatable on the jack head for transportation by the jack while lowered in the pit and liftable by the jack to bridge the track gap, said table having surface-track-completing rails rigidly held thereto, four vertical supports in the pit having upwardly-facing abutment portions adjacent each of the four rail ends of the interrupted surface track, said supports being seated at their lower ends at the bottom of the pit and laterally sustained, by walls of the pit, guides adjacent the top of the pit rigidly carried by said supports and cooperative with the table to laterally align the table rails with the surface track rails and prevent sidewise displacement of the table from surface-track-completing position while elevated, and devices carried by the table adjacent the four corners thereof releasably engageable over said upwardly-facing abutment portions of said vertical supports to temporarily sustain the table independently of the jack head with its rails registered with the surface track rails.

38. In a drop pit jack, the combination with a track pit, a wheeled jack traveling in the pit, and a surface railway track interrupted at the top of the pit, of a transfer table independent of the jack seatable on the jack head for transportation by the jack while lowered in the pit and liftable by the jack to bridge the track gap, said table having surface-track-completing rails rigidly held thereto, four vertical supports in the pit having upwardly-facing abutment portions adjacent each of the four rail ends of the interrupted surface track, said supports being seated at their lower ends at the bottom of the pit and laterally sustained by walls of the pit, guides adjacent the top of the pit rigidly carried by said supports and cooperative with the table to laterally align the table rails with the surface track rails and prevent sidewise displacement of the table from surface-track-completing position while elevated, and four horizontally-slidable bolts held to the table under the ends of the table rails and shiftable outwardly longitudinally of said rails into position to seat on said abutment portions of the supports to temporarily sustain the table independently of the jack head with its rails registered with the surface track rails.

39. In a drop pit jack, a traversing carriage supporting the jack, a standing board on a carriage, a hydraulic pump and means for raising the jack head hydraulically by the action thereof also supported on the carriage, an air motor on the carriage, means for connecting the motor and driving mechanism for traversing the carriage, an air-conducting pipe, a carriage adapted to be coupled to a source of compressed air, controlling means controlling the drive of the carriage and the direction of rotation of the motor shaft, means controlling the application of the compressed air to the motor, means controlling discharge of the pump and the charging and discharging of the hydraulic jack, all said means being positioned within reach of the operator on the standing board.

40. In a drop pit jack, the combination with a traversing carriage, of a hydraulic jack and pump mounted on the carriage, a motor on the carriage, means for connecting the motor with the pump and with the drive for traversing the carriage, a conduit on the carriage through which a motive power agent may be fed to the motor, means for coupling said conduit to a source of motive power outside the carriage, a standing board on the carriage, and means on the carriage within reach of the operator on said standing board for controlling the application of the motive power agent to the motor, the drive of the carriage from said motor, and also the fluid connections of the pump and hydraulic jack which govern the raising and lowering of the jack.

41. In a drop pit jack, the combination with a track pit and a surface railway track interrupted at the pit, of a wheeled jack traveling in the pit, a transfer table transportable in the pit by the jack and liftable by the jack to complete the surface track, said table having parallel track rails rigidly held thereon adapted to bridge the gap in the surface track, shiftable table sustaining devices on the table, and fixed supporting means at the surface track interruption upon which the end portions of the surface track rails at opposite sides of the pit are supported and on which said shiftable sustaining devices on the table are adapted to be releasably supported to temporarily sustain the table independently of the jack with its rails level with the surface track rails.

42. In a drop pit jack, in combination wheels connected by axles in pairs, two side frames each supported on the axles adjacent the wheels and each side frame having an extension, a shaft journaled in the extensions, a pinion on the shaft, a gear wheel on an axle meshing with the pinion, a motor supported by the side frames, and means for operating the shaft by the motor.

43. In a pit jack, the combination with a surface railway track pit, a surface railway track interrupted at the top of the pit and beyond one side of which said pit extends, and rails in the pit forming a sub-surface track crossing the line of the surface track, of a surface-track-completing device movable in the pit vertically and transversely of the surface tracks and including a pair of parallel rails upon which the load may be rolled, means for releasably holding said device at the top of the pit with said pair of rails in surface-track-completing and load receiving position, a wheeled carriage in the pit on the sub-surface track, means on the carriage for supporting said device for transportation by the carriage transversely of the surface track and movable with the carriage into position beneath said releasably held device, and power-operated means on the carriage for lifting said supporting means into engagement with said device and lowering said supporting means with the released device separably seated thereon into the pit for transportation of the device and its load by the carriage transversely of the surface track.

44. In a pit jack, the combination with a surface railway track pit, two or more surface railway tracks interrupted at the top of the pit, and a sub-surface pit-track extending transversely of the surface tracks, of a pair of surface-track-completing and load-receiving rails, a transfer table movable in the pit both vertically and transversely relatively to the surface tracks and to which said load-receiving rails are rigidly held, releasably engageable supports on the table and in the pit for temporarily holding the table against downward movement relatively to either of said surface tracks with the rails thereon in position to complete the surface track with which the table is in line, rigid guides located at the top of the pit and cooperative directly with the table to hold the table against shifting transversely of a surface track completed by the table rails, a pit carriage running on the pit track, and a vertically shiftable transfer-table-supporting means mounted on the pit carriage to travel therewith and adjustable up and down relatively thereto and to the temporarily held table.

45. In a railway pit jack, the combination with a surface track pit having track rails therein and two or more surface tracks interrupted at the top of the pit, of a wheeled jack adapted to traverse the rails of the pit track, a transfer table downwardly seatable upon the jack head, said table having parallel load-receiving rails, shiftable table-supporting means carried by the transfer table, and stationary means adjacent each surface track engageable by said shiftable means and the table to temporarily sustain the table in, and prevent horizontal displacement thereof from, its positions for completing the respective surface tracks with the load-receiving rails of the table.

46. In a pit jack, the combination with a surface railway track pit, two or more surface railway tracks interrupted at the top of the pit, and a sub-surface pit track extending transversely of the surface tracks, a pair of surface-track-completing and load-receiving rails, a transfer table to which said rails are held, releasable supporting means for temporarily sustaining the table against downward movement with its rails level with the rails of either one of said surface tracks and adapted to sustain the load of a railway vehicle running on said surface track, a wheeled pit carriage running on the pit track, table supporting means on said carriage adjustable vertically to engage and lift the table beyond its said independently supported track-completing position to relieve pressure on the releasable supporting means for facilitating release of the table, said adjustable supporting means being operable to lower the released table to a position for traversing thereof in the pit and to subsequently elevate it into position to complete a different one of said surface tracks following a traversing movement of the table with the carriage, power means on the carriage for operating said vertically-adjustable supporting means, and stationary means adjacent each surface track interruption engageable by the table, when elevated above its traversing position with the carriage below a surface track interruption, to register the track-completing rails of the table transversely and longitudinally with the interrupted rails of the surface track and prevent horizontal displacements of the table while out of its position of traverse.

47. In a drop pit jack, the combination with a track pit, and a surface railway track interrupted at the top of the pit, of a wheeled jack traveling in the pit, a transfer table transportable in the pit by the jack and liftable by the jack to complete the surface track, said table having surface-track-completing rails rigidly supported thereon adapted to bridge the gap in the surface track, four fixed vertical supports in the pit seated at their lower ends at the bottom of the pit and supporting the four rail ends of the interrupted surface track at their upper ends at the top of the pit, and four table-sustaining bolts slidably held to the table below the four ends of the table rails to move endwise longitudinally of the rails, said vertical supports having portions over which said bolts are slidable and upon which the bolts are adapted to rest, when moved outward relatively to the table, to temporarily sustain the table independently of the jack with its rails level with the surface track rails.

48. In a pit jack of the character described, the combination with a surface railway track pit at the top of which the surface track is interrupted, of a transfer table movable both vertically and transversely in the pit relatively to the surface railway track, a pair of surface track-completing rails on the transfer table, releasable means for temporarily supporting the table at the top of the pit with its rails level with the surface track rails, vertical guides for the transfer table in the sides of the pit for laterally aligning the track-completing rails with the rails of the surface track as the table is elevated to complete the surface-track and for holding the table against lateral movements while the table is temporarily supported in surface-track-completing position, a pair of track rails in the pit extending transversely of the surface railway track, a wheeled carriage supporting the transfer table when said releasable means is released and adapted to be traversed in the pit on said pit track rails, and a table-supporting jack on the carriage separably engageable with the table for lifting and lowering the transfer table to and from surface-track-completing position and into and out of engagement with said guides.

49. In a pit jack of the character described, the combination with a surface railway track pit at the top of which the surface track is interrupted, of a transfer table carrying a pair of surface-track-completing rails and adapted for working vertically in the pit in the line of the surface track and also for movement within the pit transversely of the surface track while lowered, vertically disposed guide members mounted in the sides of the pit for guiding the table in its said vertical movements to and from track-completing position and for holding the table against lateral movements while in track-completing position with the track-completing and surface track rails in lateral alignment, supporting ledges on each of said guide members for temporarily supporting the transfer table adjacent the top of the pit against downward movement with its rails in surface-track-completing position, supporting devices carried by the table shiftable into and out of position for resting on said ledges, a traversing wheeled carriage on which the transfer table is mounted movable in the pit transversely of the surface track, and table-supporting means on the carriage separately engageable with the table for lifting the transfer table from a lowered table-traversing position in which the table is free from said guide members to an elevated position in engagement with said guide members in which the table is adapted to be supported by said supporting devices and ledges with its track-completing rails positioned to complete the surface track.

50. In a railway pit jack, the combination of a traversing carriage, a transfer-table-supporting and elevating means on the carriage, a transfer table independent of said supporting and elevating means and carriage provided with load-receiving track rails and adapted to seat upon said supporting and elevating means for vertical movement of the table relatively to the carriage and traversing movement of the table with the carriage, and four table-supporting members slidably held to the table under the four ends of the track rails to move horizontally and adapted for releasable engagement with a supporting means independent of the carriage and its table-supporting and elevating means to temporarily sustain the table in an elevated position relatively to the carriage, said table-supporting and elevating means on the carriage being disengageable from the table when the table is independently supported by said supporting members by a lowering operation of said supporting and elevating means.

51. In a drop pit jack, the combination with a track pit and a surface railway track interrupted at the top of the pit, of a wheeled jack traveling in the pit, a transfer table transportable in the pit by the jack and liftable by the jack to complete the surface track, said table having surface-track-completing rails rigidly supported thereon adapted to bridge the gap in the surface track, four fixed vertical supports in the pit seated at their lower ends at the bottom of the pit and supporting the four rail ends of the interrupted surface track at their upper ends at the top of the pit, and four table-sustaining bolts slidably held to the table below the four ends of the table rails to move endwise longitudinally of the rails, said vertical supports having portions over which said bolts are slidable and upon which the bolts rest, when moved outward relatively to the table, to temporarily sustain the table independently of the jack with its rails level with the surface track rails, and upstanding elements carried by said supports and cooperative directly with the table, when the table is lifted from its transporting position by the jack, to hold the table rails in the vertical longitudinal planes of the surface track rails.

In testimony whereof I hereunto affix my signature.

WILLIAM J. WATERS.

CERTIFICATE OF CORRECTION.

Reissue Patent No. 16,989. Granted June 5, 1928, to

WILLIAM J. WATERS.

It is hereby certified that error appears in the printed specification of the above numbered patent requiring correction as follows: Page 13, line 117, claim 49, for the word "separately" read "separably"; and that the said Letters Patent should be read with this correction therein that the same may conform to the record of the case in the Patent Office.

Signed and sealed this 1st day of October, A. D. 1929.

(Seal)

M. J. Moore,
Acting Commissioner of Patents.